Sept. 26, 1961 A. F. STEVENSON ET AL 3,001,768
METHOD AND MEANS FOR SUBJECTING A LIQUID MEDIUM
TO VIOLENT VIBRATIONAL PRESSURE EFFECTS
Filed Jan. 22, 1957
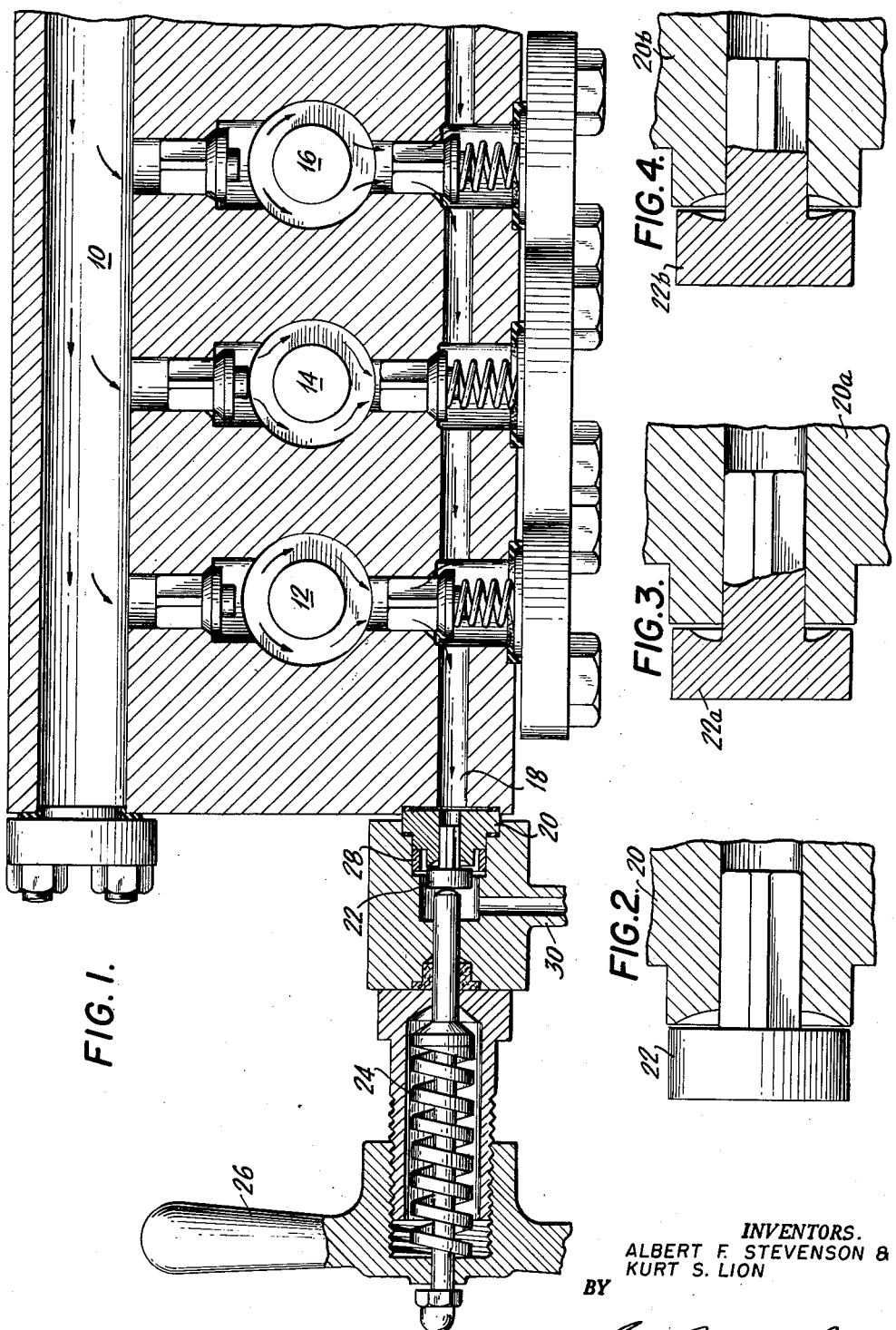
INVENTORS.
ALBERT F. STEVENSON &
KURT S. LION
BY
Eyre, Mann & Lucas
ATTORNEYS.

United States Patent Office 3,001,768
Patented Sept. 26, 1961

3,001,768
METHOD AND MEANS FOR SUBJECTING A LIQUID MEDIUM TO VIOLENT VIBRATIONAL PRESSURE EFFECTS
Albert F. Stevenson, 79 N. Main St., Wolfeboro, N.H., and Kurt S. Lion, 9 Herbert Road, Belmont 78, Mass.
Filed Jan. 22, 1957, Ser. No. 635,354
9 Claims. (Cl. 259—1)

In our earlier application, Serial No. 208,464, filed January 30, 1951, now abandoned, we disclosed that if an aqueous suspension of yeast cells was subjected to vibrations of sonic or ultrasonic frequency with an intensity substantially beyond the intensity necessary to obtain cavitation in the water, a rupturing of the yeast cells would take place, releasing the protein content of the cells so that it would readily dissolve in the aqueous medium. This invention relates to an improved method of carrying out such process. This application is a continuation-in-part of our earlier application Serial No. 363,860, filed June 24, 1953, now abandoned.

One of the usual methods employed in homogenizing milk is to force the milk radially outward between two plates. The milk is subjected to a positive pressure by a plunger pump forcing it into the center between the plates and the plates are held compressed together by heavy but adjustable yielding pressure. This means that the milk is maintained compressed at a counterpressure equal to such yielding pressure and the plates, acting under this counterpressure, separate a distance sufficient to permit the milk to pass through between the plates in the volume supplied by the plunger pump. The pressure on the milk remains substantially constant. When the milk emerges from between the plates it is thrown with high velocity against an impact ring spaced away a short distance from the edges of the pressure plates. It is generally believed that the homogenization takes place by a shearing action and by an impact action.

According to the present invention, we use an apparatus which superficially resembles the ordinary milk homogenizer but which in fact is so changed that it acts on an entirely different principle.

In our apparatus we employ, as before, two plates or valve members which meet face to face, but in this case a cavity of substantial size is formed in one or both of the valve members preferably arranged concentrically with the axis of the plates. As before, the liquid to be acted upon passes through a central opening through one of the plates and then moves out radially between them. In our structure the two plates are pressed together but by a pressure substantially greater than that normally used in the homogenizers. Such pressure, for example, may range upward from 5000 pounds per square inch to as much as 10,000 pounds or more.

The primary effect of having the cavity formed between the plates is that the liquid passing through this cavity and then between the areas where the plates meet face to face causes high frequency vibrations to be set up within the actual mass of one or both of the valve members. A secondary effect of the cavity is that the liquid while within the cavity (particularly adjacent its outer periphery) is subjected to the high pressure which we employ on which are superimposed the very great forces of the high frequency vibrations.

In order that vibrations may take place within a valve member, it is necessary to have both mass and restoring force or elasticity. It is also a fact that the vibrations within the valve member may ultimately cause such member to fracture. For these reasons the valve member in which the cavity is formed must be made relatively strong and heavy and of a tough, resilient metal. For example, we have found that the valve member should have a minimum thickness equal to at least 25% of the diameter. The metal of which the valve members should be made, must as previously stated, be elastic; for example a metal showing a Young's modulus of elasticity in excess of 9. At the same time it must be tough to resist fracture. For example, we may use an annealed medium carbon steel or a steel which has been alloyed to give it additional toughness. It is also possible to use metals such as the bronzes sometimes employed in making bells. However, for ordinary purposes an annealed carbon steel is satsifactory and is the easiest to use.

In regard to the cavity formed in the valve member, this must be of substantial size and preferably it is arranged concentrically relative to the periphery of the valve members. This cavity may, for example, be large enough so that only a relatively narrow peripheral band of contact exists between the valve members but it must not be so large as to form only a line contact between the members. Such a line contact would not withstand the strains of the device.

Even if the cavity does not come out close to the periphery of the valve members, it should have an overall diameter equal to at least one and one-half times the overall diameter of the passage through which the liquid is admitted into the cavity so that there is a substantial area in which the liquid is between the solid portions of the valve members and thereby subject to the vibrations that are set up.

Ordinarily the cavity will have its greatest thickness in the area where the liquid is admitted into the cavity and we have found it advisable to have the cavity tapered from this central maximum thickness toward the periphery. For example, we have found it advisable that the walls of the cavity meet at a substantially acute angle near their margin.

When the cavity is thus formed with a taper towards the zone where the two valve members meet, the flow velocity of the liquid under treatment is increased on its way from the central to the peripheral portions of the valve system where a high velocity is attained. The pressure behind the liquid entering the cavity tends to force an opening between the valve members but the high velocity of the liquid at the periphery of the valve system causes a vacuum and constraining forces to be set up perpendicular to the flow direction. This operates against the pressure on the liquid and intermittently forces the two valve members together. Under the influence of the pressures and vacuum effects which alternate at the periphery, the marginal portions of the valve members are forced apart and together and oscillations are set up in at least one of the valve members. These oscillations can have the character of harmonic oscillations or of relaxation oscillations. However, they apparently do not appreciably move the valve members bodily; instead they appear to cause vibrations to occur actually in the mass of at least one of the valve members. This means that such valve member is undergoing deformation, with the result that the maximum separation of the valves will not occur simultaneously around the periphery. Instead, openings will form in certain areas between the valve members while other portions of the valve members are in contact between the openings. The axis of these movements will be continually changing from one area to another setting up bending oscillations, an effect somewhat similar to that which leads to the so-called Chladni figures which are commonly described in acoustical textbooks. It would be substantially impossible for the masses of metal which make up the valve members to move bodily with the high frequencies required for our operation.

To get these distortion vibrations in a solid mass of metal, it is necessary not only to have the cavity already described but to have heavy pressures considerably greater than those employed for simple homogenizing purposes. Where light pressures substantially below 5000 pounds per square inch are used to tension the valve members towards each other, the valve members may simply move apart so that no appreciable vibrations will occur of the sort which we find necessary for our purpose. As stated elsewhere, we have found it desirable to use pressures which certainly are in excess of 5000 pounds per square inch and preferably range from 8000 to 10,000 pounds or even higher.

In former experiments in which we treated small batches of yeast slurry with powerful ultrasonic generators we were able to establish the fact that a relationship exists between the power level of the ultrasonic energy and the percentage of ruptured yeast cells. By the operation of the present invention we are able to rupture at least 50% up to as much as 75% or more of the cells in a 10% yeast slurry. In view of the fact that our previous experiments had established that the effect on yeast is available as a means to measure the ultrasonic power level, we can state positively that our ability to rupture at least 50% of the cells in such a slurry is conclusive evidence that high frequency vibrations of great intensity are occurring and that the action is quite different from that of an ordinary homogenizer.

A device for carrying out our invention is illustrated in the accompanying drawing in which FIG. 1 is a sectional view through the device.
FIG. 2 shows a detailed section through the plates and
FIGS. 3 and 4 show modifications of such plates.

As will be recognized by those skilled in a related art, the device shown is basically similar to a homogenizer such as used in the dairy industry. The material to be passed through the device is admitted into the chamber 10 and then is forced by the pistons 12, 14 and 16 into the pressure line 18. As is well understood, the pistons 12, 14 and 16 are operated at relative time intervals so that the pressure in line 18 will be maintained constant. No detailed description of this part of the mechanism is given, as such structures are well-known.

The liquid from the pressure line 18 passes through the valve seat 20 and in order to escape, it must move or distort the disc 22 which is held compressed toward the valve seat member 20 by the heavy spring 24. The tension on the spring 24 can be adjusted by the handle 26. In order for the liquid to leave the device it passes between the valve seat member 20 and the disc 22 and strikes against the ring 28. It then passes around the sides of the disc 22 and escapes through pipe 30.

If the member 20 and valve member 22 had meeting faces that were plane throughout, the structure would be substantially the same as an ordinary milk homogenizer. However, as has previously been emphasized, we change the shape of the meeting faces of these members in order to produce a new and radically different effect.

We have previously brought out that it is necessary to form a cavity between these two faces which extends out toward but does not reach the periphery of the smaller of the two members, which in this case is member 22. In FIG. 2 the cavity is formed in member 20 as is clearly shown in FIG. 2 of the drawings. In FIG. 3 the cavity is formed in the member 22a which corresponds to member 22 and in FIG. 4 the cavity is shown as being formed in part in member 20b and in part in member 22b. In each case it will be noted that the cavity has a taper toward its peripheral edge so that the opposing faces meet at an acute angle and it will also be noted that in each case the cavity is substantially larger than the overall diameter of the passage through member 20 by which the liquid to be acted on reaches the cavity. As previously brought out, the overall diameter of the cavity ordinarily should be at least one and one-half times the diameter of the passage but should not be great enough to prevent the members 20 and 22 from meeting in a flat face-to-face zone adjacent their peripheries.

As has already been emphasized, by having the cavity of substantially larger area than the passage through the member 20, there is an appreciable zone in which the liquid under treatment is between the solid portions of the two valve members and thereby subject to the vibrational effects that are set up. It is also true that the liquid in the cavity will move much more slowly than the liquid which is being forced out between the flat meeting faces of these two members, and therefore will be subjected to the vibrations for a somewhat longer period of time.

We have already stated that in order to set up the type of vibrations which we wish to have occur, it is necessary to have a heavy pressure holding the valve members together. This pressure is generated by spring 24 and the tension of this spring may be adjusted by turning the handle 26. When this pressure reaches a level in excess of 5000 pounds per square inch, and preferably in the order of about 8000 pounds per square inch, the counterpressure exerted by the piston pump which forces the liquid into the passage 18 will build up until it is great enough to actually set up distortional oscillations in the metal adjacent the periphery of the meeting area of the valve members. These oscillations may be in either or both of the valve elements.

When operating our device in the manner indicated, we have endeavored to ascertain whether the valve member 22 moves bodily to any appreciable extent. Measurements on the outer end of the rod through which the pressure of spring 24 is transmitted to member 22 failed to show any appreciable amount of bodily movement. This is not conclusive because of the possibility that vibrations might be absorbed within this rod, but certainly this is some indication of the probability that there is little or no bodily movement of the valve member and that the escape of liquid from between the valve members results from the distortion effects which have already been described.

As a guide to the size of apparatus, pressures to be used and amount of liquid to be pumped through the device, we may state that in an apparatus in which the member 22 has a diameter of about ¾ inch, we have found it necessary to use a pressure on spring 24 of at least 5000 pounds per square inch and we have found that we get better results at 8000 pounds per square inch or even higher. With a device of this size the plungers 12, 14 and 16 should be operated so as to pass from 50 to 150 gallons of liquid per hour through the machine, and working at a flow of 100 gallons per hour gives very good results. This will use about 8 horsepower. As previously stated, the size of the cavity between members 22 and 20 must be substantial and cavities such as indicated in FIGS. 2, 3 and 4 have been found very satisfactory. On the other hand, where a single narrow groove was cut in the face of a member corresponding to member 22 and this groove had side walls substantially perpendicular to the face of such member, the conditions were not correct to create the desired oscillations and the desired results were not obtained. It is understood that the proportions stated are given simply as guides to an efficient type of machine and that they may be modified greatly as desired.

In developing our invention, we employed a freshly prepared suspension of yeast cells in water containing approximately 10% of yeast solids. This was passed through a device as shown in FIGS. 1 and 2 at a pressure of 8000 pounds per square inch and at the rate of 100 gallons per hour. An examination of the treated material showed that in excess of 75% of the yeast cells had been so ruptured that their protein content was dissolved or dispersed in the water. By increasing the pressure the percentage of ruptured yeast cells in the liquid can be increased somewhat and the percentage yield is also increased. However, this adds to the cost of the equipment and substantially equally good commercial results were obtained by passing the material through a second stage of treatment at substantially the same pressures.

When the same slurry of yeast cells under like conditions was passed through an ordinary milk homogenizer comprising two flat plate-like valve members that contacted throughout substantially their area, the vibrational effect was apparently absent and there was no appreciable rupturing of the yeast cells and no appreciable liberation of their protein content into the aqueous solution.

What we claim is:

1. The method of subjecting a liquid medium to the disintegrating effects of violent ultrasonic oscillating pressures which comprises forcing such liquid medium under pressure in a continuous stream through an entry passage and thence centrally into a cavity of substantial size defined by opposing walls of two vibratable resilient metal valve members held together under pressure and having contacting peripheral portions adapted to form a liquid-tight pressure-releasable band seal when in contact with each other, such cavity having a maximum height adjacent the point of entry of the liquid medium and diminishing gradually in height to its edge at the point of sealing contact of said walls at the periphery of the members, and having an overall width equal to at least one and one-half times the diameter of the passage through which the liquid is conducted into the cavity; such liquid medium being introduced into the cavity at a pressure in excess of 5000 pounds per square inch while holding said resilient members pressed together by a pressure in excess of 5000 pounds per square inch, applying through the liquid medium to the resilient member opposite the entrty passage a pressure exceeding the pressure holding the members together whereby a valve member is deformed and bends under such pressure and an exit passage is forced open between the members at their periphery and forcing liquid medium through the exit passage in order to emerge from the cavity, and then as a result of exit of liquid medium reducing the thus applied pressure to below the pressure holding the members together, and so closing the exit passage, the resulting intermittent oscillating liquid medium-applied pressures causing at least one of said members to vibrate with a frequency of at least three hundred vibrations per second, the vibrations simultaneously causing violent oscillatory effects upon the liquid medium in the cavity and in the exit passage.

2. The method of claim 1 in which the conditions of operation are such that the liquid medium upon exit from the cavity has a temperature at least 15° F. higher than its entering temperature.

3. The method of claim 1 in which the pressure upon the entering liquid is about 8000 pounds per square inch.

4. The method of claim 1 in which the liquid medium comprises an aqueous slurry of yeast cells.

5. An apparatus for subjecting a liquid medium to the disintegrating effects of violent ultrasonic oscillating pressures, which comprises two resilient vibratable metal valve members whose peripheral portions are adapted to form a liquid-tight band seal when in contact with each other, spring means for resiliently pressing said members together by a presure in excess of 5000 pounds per square inch, a passage through one of said members located centrally therein and opening into a cavity of substantial size defined by opposing walls of said valve members, the cavity having a maximum height adjacent the passage and diminishing gradually in height to its edge at the point of sealing contact of said walls at the periphery of the members, and having an overall width equal to at least one and one-half times the diameter of the passage, a pump for forcing a liquid medium in a continuous stream under a presure in excess of 5000 pounds per square inch and greater than the pressure holding the resilient members together through said passage and into said cavity at least one of said resilient members deforming and bebending under the effect of such pressure on said liquid without such resilient member undergoing substantial bodily movement.

6. An apparatus in accordance with claim 5 in which the cavity corresponds to a concavity in configuration.

7. An apparatus in accordance with claim 5 in which at least one of said resilient valve members has a disk shape.

8. An apparatus in accordance with claim 5 in which the walls of the cavity meet at an acute angle at the point of sealing contact thereof.

9. An apparatus in accordance with claim 5 in which the valve members are made of resilient steel.

References Cited in the file of this patent

UNITED STATES PATENTS

| 2,524,951 | Ashton | Oct. 10, 1950 |
| 2,693,944 | Fowle | Nov. 9, 1954 |
| 2,792,804 | Bougoucos et al. | May 21, 1957 |

FOREIGN PATENTS

| 494,204 | Great Britain | Oct. 18, 1937 |

OTHER REFERENCES

Beckwith et al.: Sonic Energy as a Lethal Agent for Yeast and Bacteria, Jour. Bacteriology, 32, 4, November 1936 article, pgs. 361–373.

Euler et al.: Wallerstein Lab. Comm., 7, No. 22, December 1944, page 226.

Vogel: Wallerstein Lab. Comm., December 1952, article pgs. 313–332.